United States Patent
Likes

(10) Patent No.: US 6,349,341 B1
(45) Date of Patent: Feb. 19, 2002

(54) METHOD AND SYSTEM FOR PROVIDING INTER-TIER APPLICATION CONTROL IN A MULTI-TIERED COMPUTING ENVIRONMENT

(75) Inventor: Donald Craig Likes, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/126,262

(22) Filed: Jul. 30, 1998

(51) Int. Cl.[7] .......................... G06F 15/16; G05B 19/00
(52) U.S. Cl. ............................. 709/249; 709/227; 700/9
(58) Field of Search ................................ 709/245, 227, 709/249, 313, 314; 700/9, 23, 25

(56) References Cited

U.S. PATENT DOCUMENTS

| | | | | |
|---|---|---|---|---|
| 4,972,367 A | * | 11/1990 | Burke | 707/10 |
| 5,432,702 A | * | 7/1995 | Barnett | 700/116 |
| 5,475,601 A | * | 12/1995 | Hwang | 700/157 |
| 5,548,535 A | * | 8/1996 | Zvonar | 702/81 |
| 5,754,830 A | * | 5/1998 | Butts et al. | 709/311 |
| 5,790,977 A | * | 8/1998 | Ezekiel | 702/122 |
| 5,805,823 A | * | 9/1998 | Seitz | 709/236 |
| 5,862,391 A | * | 1/1999 | Salas et al. | 713/300 |
| 5,886,896 A | * | 3/1999 | Lantz et al. | 700/116 |
| 5,978,578 A | * | 11/1999 | Azarya et al. | 717/1 |
| 6,070,196 A | * | 5/2000 | Mullen, Jr. | 709/250 |
| 6,112,246 A | * | 8/2000 | Horbal et al. | 709/230 |
| 6,163,801 A | * | 12/2000 | O'Donnell et al. | 709/213 |
| 6,208,904 B1 | * | 3/2001 | Mullen, Jr. | 700/9 |
| 6,233,203 B1 | * | 4/2001 | O'Donnell et al. | 709/102 |
| 6,240,331 B1 | * | 5/2001 | Yun | 700/121 |

FOREIGN PATENT DOCUMENTS

| | | | | |
|---|---|---|---|---|
| JP | 01273108 | * | 11/1989 | H01L/21/02 |
| JP | 07066096 | * | 3/1995 | G05B/19/18 |
| WO | 92/07331 | * | 4/1992 | G06F/15/40 |

* cited by examiner

Primary Examiner—Zarni Maung
Assistant Examiner—Andrew Caldwell

(57) ABSTRACT

A system and method for providing inter-tier application control in a multi-tiered computer computing environment. In an example embodiment for a multi-tier computing environment that includes a first tier application program, a second tier application program, and a plurality of third tier control elements, connection identifiers that respectively reference connections between the second tier application program and the third tier control elements are associated with respective third tier control element identifiers. When the second tier application program receives a message from the first tier application program, mapping software indicates to the second tier application program a third tier control element identifier based on the message. A control message generated by the second tier application program is transmitted to a third tier control element based on the indicated third tier control element identifier and the associated connection.

13 Claims, 7 Drawing Sheets

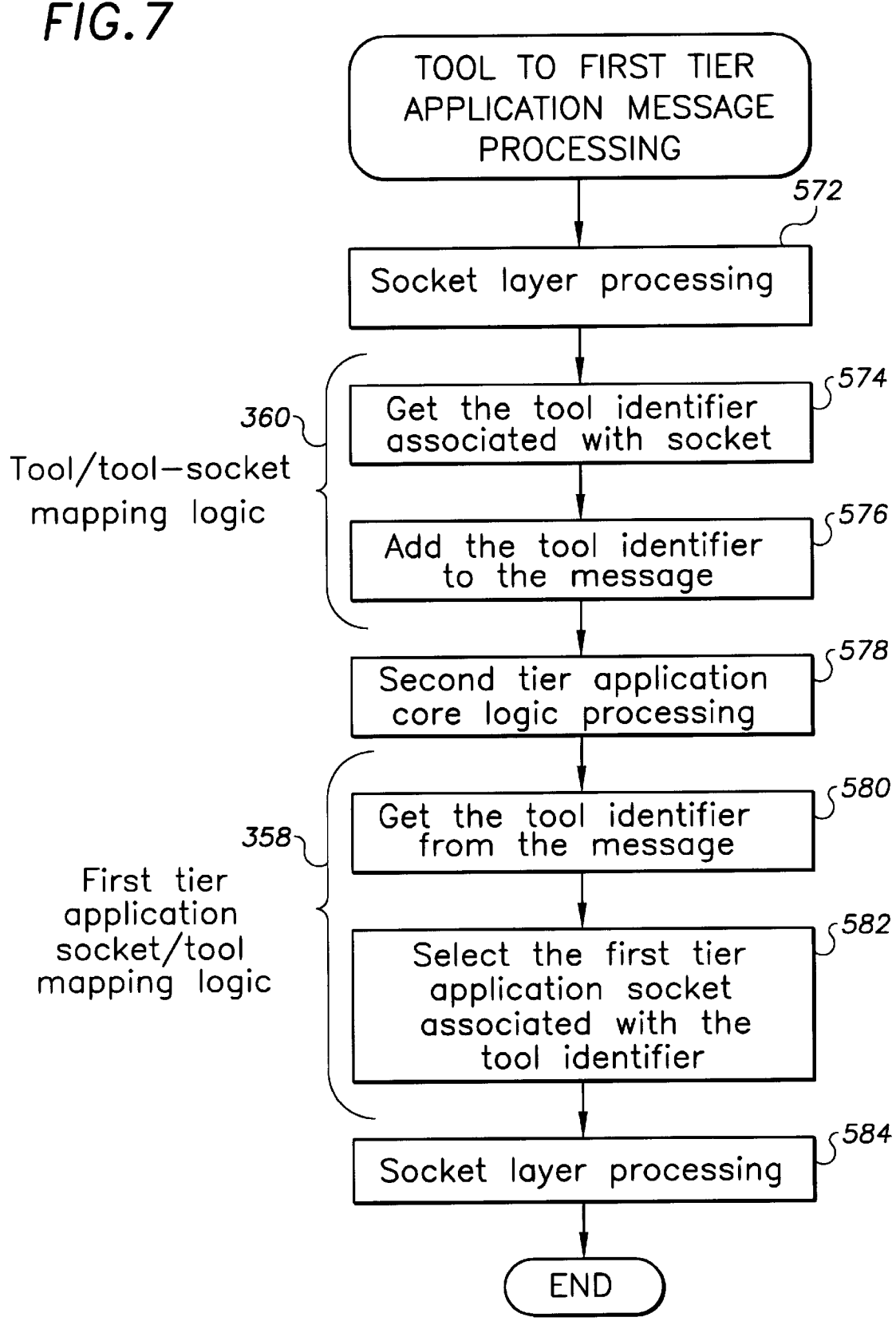

METHOD AND SYSTEM FOR PROVIDING INTER-TIER APPLICATION CONTROL IN A MULTI-TIERED COMPUTING ENVIRONMENT

FIELD OF THE INVENTION

The present invention is generally directed to computer controlled manufacturing systems, and more particularly to control of application programs in a multi-tiered computing arrangement.

BACKGROUND OF THE INVENTION

Early computer controlled manufacturing arrangements, for example, those for manufacturing semiconductors, generally included a central computer system for controlling the overall factory floor. Coupled to the central computer system, via a network for example, were satellite computers programmed for respectively controlling selected tools. The tools were often directly coupled to serial or parallel ports or special adapter cards of the satellite computers.

The early systems generally controlled a single tool with a single satellite computer. Thus, a single process running on the single computer provided communication between the central computer system and the single tool. As manufacturing output requirements increased, additional tools were coupled to the satellite computers. To establish the required communications between the central computer system and the newly added tools without incurring undesirable delays associated with developing new software, replicated processes were used. Specifically, for each tool coupled to a satellite computer, a respective process executing on the satellite computer provided the necessary communication interface between the central computer system and the tool.

The total commuter and human resources consumed by adding new processes each time new tools are coupled to satellite computers has become significant. Generally, the resource requirements are some function of the number of satellite computers and the number of tools. Thus, in a large manufacturing arrangement, the resource requirements can be considerable. Therefore, a system and method that addresses the above identified problems is desirable.

SUMMARY OF THE INVENTION

In one embodiment, a method is provided for inter-tier application control in a multi-tier computing environment that includes a first tier application program, a second tier application program, and a plurality of third tier control elements, wherein the second tier application program initiates processing of the third tier control element in response to messages from the first tier application program. The method comprises associating connection identifiers that respectively reference connections between the second tier application program and the third tier control elements with respective third tier control element identifiers. For messages that are sent from the first tier application program to the second tier application program to initiate processing sequences by the third tier control elements, respective third tier control element identifiers are indicated for the messages, The second tier application program performs application specific processing on the messages, and connections are selected for transmitting control messages to the third tier control elements based on the indicated third tier control element identifiers and the associated connection identifiers.

In another embodiment, a method comprises associating connection identifiers that respectively reference connections between the second tier application program and the third tier control elements with respective third tier control element identifiers and receiving a message from the first tier application program. A third tier control element identifier based on the message is indicated to the second tier application program, and the second tier application generates a control message. The control message is transmitted to a third tier control element via a selected connection that is based on the indicated third tier control element identifier and associated connection identifier.

An apparatus is provided for inter-tier application control in a multi-tier computing environment that includes a first tier application program, a second tier application program, and a plurality of third tier control elements, wherein the second tier application program initiates processing of the third tier control element in response to messages from the first tier application program. The apparatus comprises means for receiving messages from the first tier application by the second tier application; means for mapping messages received from the first tier application to respective connections between the second tier application and the third tier control elements) and means for transmitting control messages generated from the received messages to the third tier control elements via the respectively mapped connections.

In another embodiment, a multi-tier computing arrangement is provided that comprises: a first tier computer system arranged to host a first tier application program; a plurality of third tier control elements; and a second tier computer system coupled to the first tier computer system and to the third tier control elements and arranged to host a second tier application program. The second tier application program includes: a first connection layer arranged to receive messages from the first tier application program; a first mapping layer arranged to indicate to the second tier application program a third tier control element identifier based on the message and associate connection identifiers that respectively reference connections between the second tier application program and the third tier control elements with respective third tier control element identifiers; a core logic layer arranged to generate a control message; a second is mapping layer arranged to select a connection to a third tier control element based on the indicated third tier control element identifier and associated connection identifier; and a second connection layer arranged to transmit the control message via the selected connections.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood upon consideration of the following detailed description of various embodiments of the invention in connection with the accompanying drawings, in which:

FIG. 7 is a flowchart that shows the processing performed when the second tier application receives a message from one of the tool control elements, according to an example embodiment of the invention.

Figure 1:
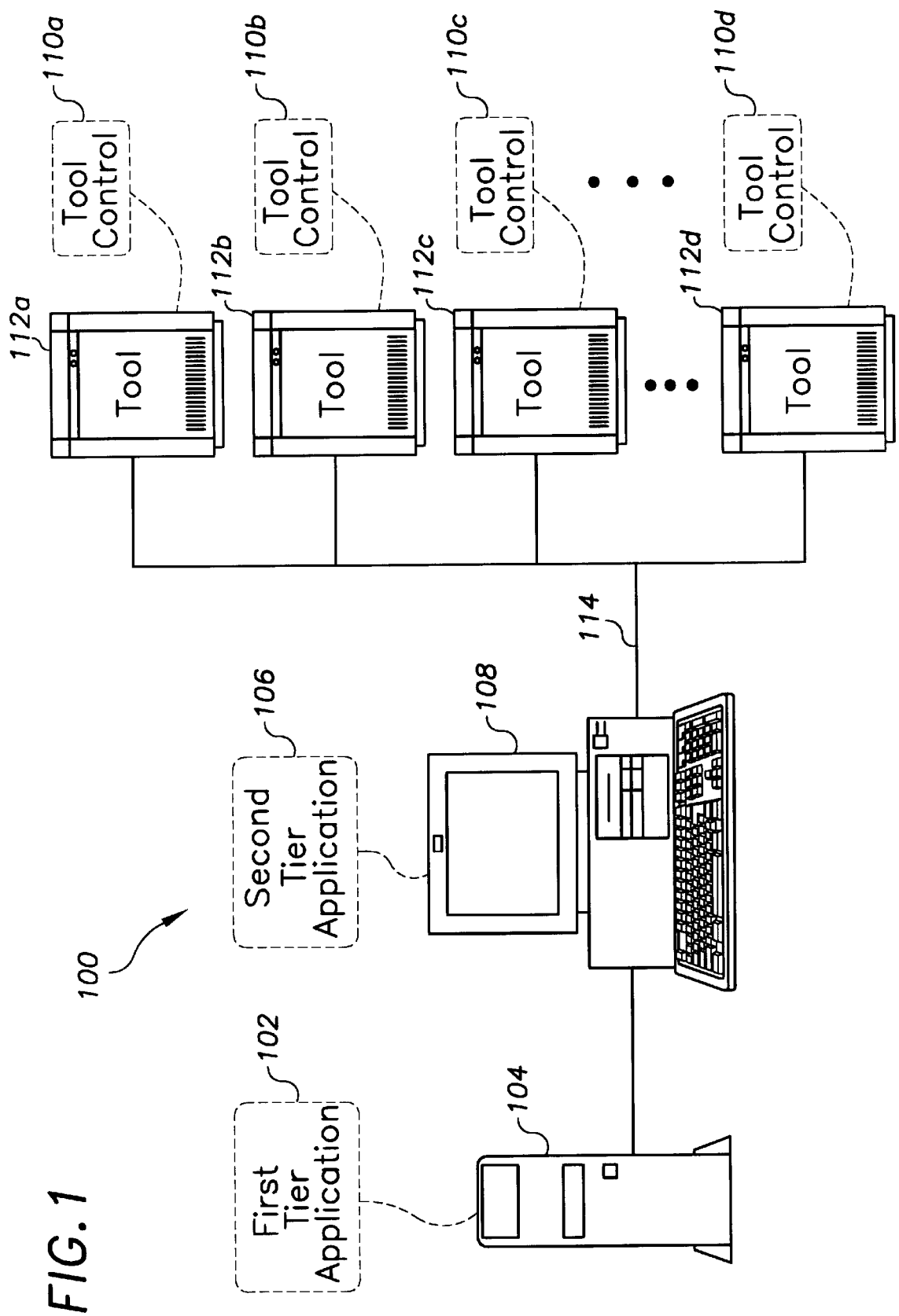
FIG. 1 illustrates a computer controlled manufacturing arrangement in which multiple levels of application programs control the manufacturing process.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of multi-tiered computing arrangements. The invention has been found to be particularly advantageous in a computer controlled semiconductor manufacturing arrangement in which multiple levels of application programs executing on various computer systems interact in the manufacturing process. While the present invention is not so limited, an appreciation of various aspects of the invention is beat gained through a discussion of various example applications described below.

Referring first to FIG. 1, a computer controlled manufacturing arrangement 100 is shown in which multiple levels of application programs control the manufacturing process. A first tier application 102 executes on a computer system 104, a second tier application 106 executes on a computer 108, and tool control elements 110a–d control operation of the respective manufacturing tools 112a–d. In an example embodiment, the first tier application 102 is manufacturing control software such as Workstream software that is commercially available from Consilium. The second tier application 106 is tailored to the specific needs of the manufacturing arrangement 100 and the particular tools 112a–d to be controlled. For example, the tools 112a–d are TEL-ALPHA-VII vertical furnaces that are available from Tokyo Electron Limited. The second tier application generally makes decisions based on selected business rules and then directs the tool to perform certain tasks in a specified order. An example computer controlled manufacturing arrangement in which the present invention may be embodied is described in U.S. Pat. No. 5,751,581 to Tau et al., entitled, "MATERIAL MOVEMENT SERVER," and herein incorporated by reference.

The tool control elements 110a–d of tools 112a–d may be viewed as third tier application programs and may be embodied in various forms depending on the particular tool. For example, a tool control element may be a programmed microprocessor that is coupled to the second tier application 106 via a network 114, wherein the second tier application 106 and tool control elements 110a–d communicate according to the TCP/IP. Alternatively, the second tier application 106 and tool control elements 110a–d may communicate via RS-232 using the SECS protocol.

While not shown, it will be appreciated that the manufacturing arrangement 100 may include additional machines, tools, control programs, and computer systems according to particular manufacturing requirements. For example, the arrangement 100 may include a track system for transporting material and work-pieces between tools. The arrangement may also include additional tools for performing other functions such as for etching, testing, and inspecting semiconductors.

Figure 2:
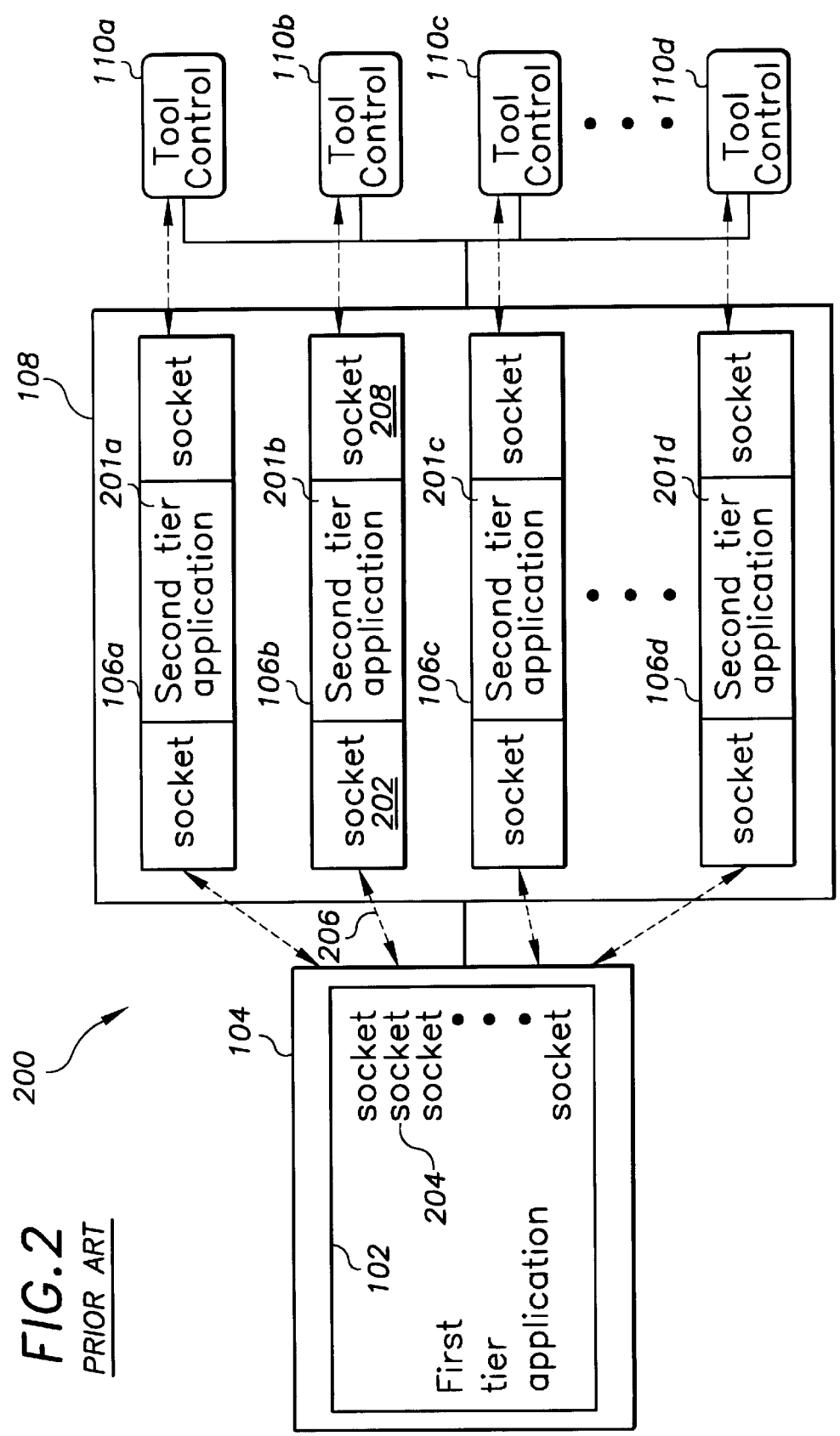
FIG. 2 is a block diagram of a prior art computer controlled manufacturing arrangement in which an instance of a first tier application executing on computer system interacts with multiple instances of a second tier application executing on computer system to control a manufacturing process.

FIG. 2 is a block diagram of a prior art computer controlled manufacturing arrangement 200 in which an instance of a first tier application 102 executing on computer system 104 interacts with multiple instances 106a–d of a second tier application executing on computer system 108 to control a manufacturing process. Interaction between the first tier application 102 and the tool control elements 110a–d occurs via respective instances 106a–d of the second tier application. The instances 106a–d of the second tier application are processes that execute on the system 108, each operating out of its own memory space. Example "processes" are those supported by the UNIX operating system.

In the example arrangement 200, the tool control elements 110a–d are generally identical and control generally identical tools (not shown). Thus, the core logic 201a–d of the instances 106a–d of the second tier application are essentially identical, wherein the core logic refers to the manufacturing control functions performed by the application.

Each of the instances 106a–d of the second tier application manages two sockets, one for communicating with the first tier application 102 and one for communicating with one of tool control elements 110a–d. Such sockets can be TCP/IP sockets to support two-way communication, for example. To illustrate, instance 106b manages a socket 202 to communicate with the first tier application 102 via socket 204 of the first tier application. Bi-directional line 206 illustrates the two-way communication. Similarly, instance 106b manages socket 208 to communicate with tool 110b. While not shown, it will be appreciated that the tool control elements 110a–d include compatible software and circuitry for socket-based communication with the instances 106a–d of the second tier application.

For the first tier application 102 to interact with one of the tool control elements, e.g., 110b, the first tier application 102 selects the socket, i.e., 204, to communicate with the instance 106b of the second tier application that is dedicated to interacting with the tool control element 110b. The first tier application 102 then sends a message via socket 204 to the instance 106b of the second tier application. For the purpose of communicating with tool control element 110b, the instance 106b, being dedicated to tool control element 110b, does not need tool identification information in the message from the first tier application 102.

The multiple instances 106a–d of the second tier application can create problems in administering the computer system 108. Specifically, memory demands of the multiple instances may necessitate a system that is prohibitively expensive. In addition, secondary storage needs (for example, hard disk space) for respective files used by the instances 106a–d may require excessive operator support for tracking the files.

Figure 3:
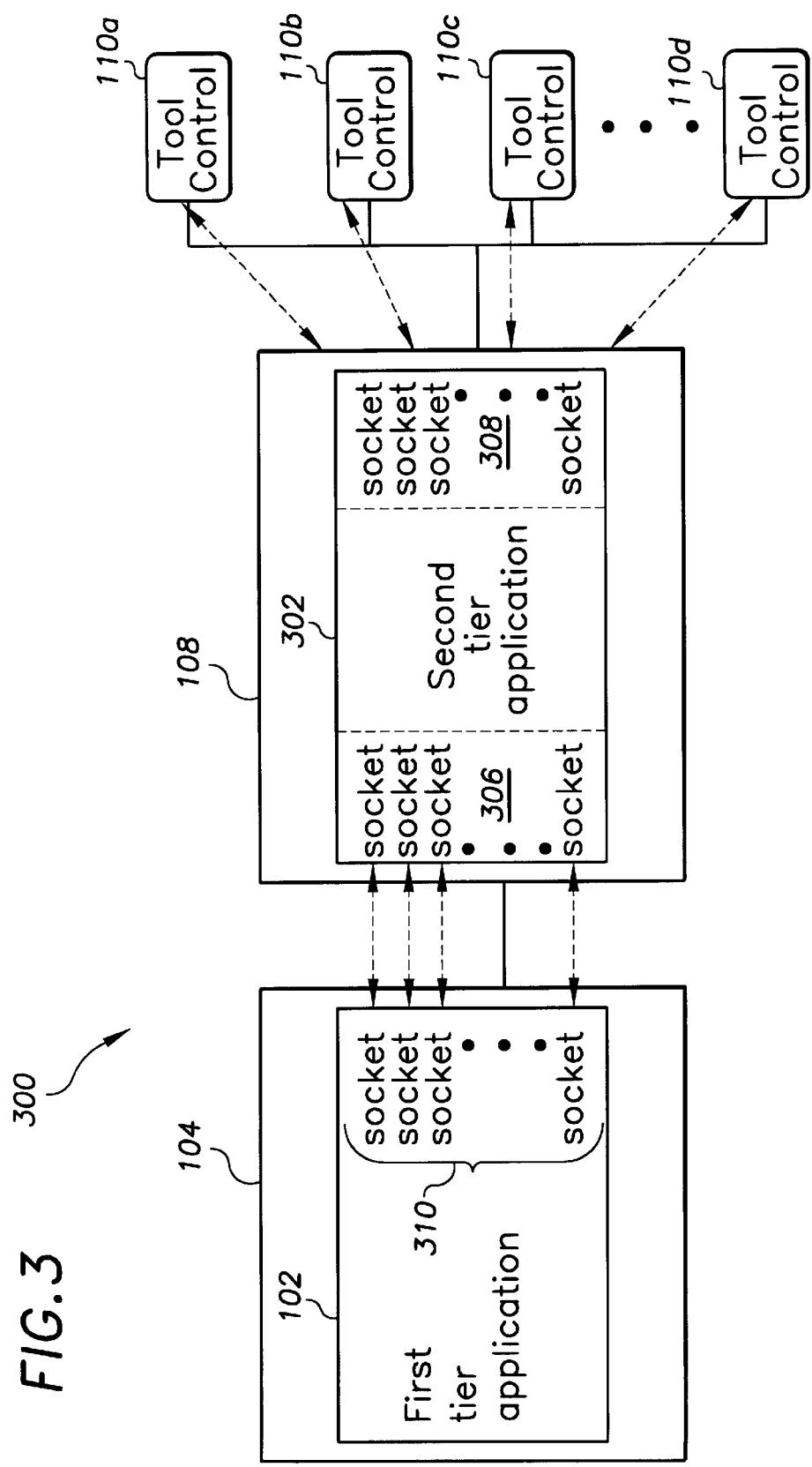
FIG. 3 is a block diagram of a computer controlled manufacturing arrangement according to an example embodiment of the invention.

FIG. 3 is a block diagram of a computer controlled manufacturing arrangement according to an example embodiment of the invention. A single instance 302 of the second tier application 106 manages communications with the first tier application 102 and the tool control elements 110a–d The single instance 302 reduces memory requirements and avoids unnecessary duplication of files.

In the arrangement 300 where there is a single instance 302 of the second tier application, for a message from the first tier application 102 to be processed and sent to one of the tool control elements, e.g., 110b, there must be an association between the sockets 306 and the respective tool control elements 110a–d, as well as an association between the sockets 308 and the respective tool control elements 110a–d. The association of sockets to tools is required because the core logic of the second tier application does not require nor does it provide an indication of a desired tool control element for a particular message from the first tier application 102.

The embodiment of FIG. 3 includes multiple corresponding sockets between the first tier application 102 and the second tier application 302. Specifically, sockets 310 of the first tier application 102 correspond to sockets 306 of the second tier application 302, respectively. In an alternate embodiment where the first tier application 102 and the second tier application 302 communicate via the ISIS message bus, a single socket is used for communication between the first and second tier applications, and message identifiers and task entry points are used for routing messages.

Figure 4:
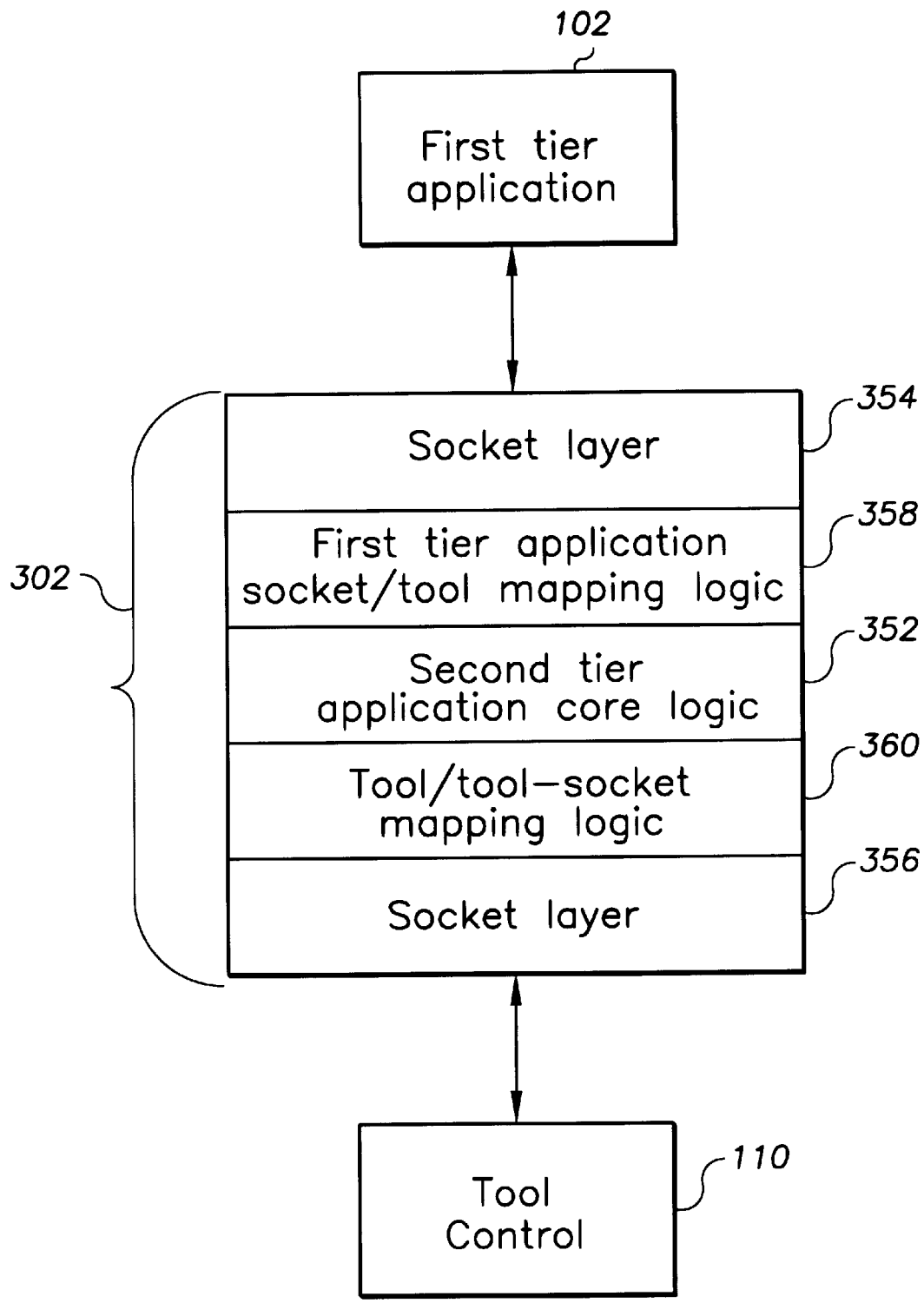
FIG. 4 is a block diagram of layers of software with which the core logic of the second tier application interacts in communicating with the first tier application and the tool is control element.

FIG. 4 is a block diagram of layers of software with which the core logic 352 of the second cite application 106 interacts in communicating with the first tier application 102 and the tool control element 110. A socket layer 354 provides a socket based interface for the second tier application 106 to the first tier application 102. In an example embodiment, the socket layer is comprised of an application embodied in Smalltalk software from Object Share. Similarly, the socket layer 356 provides a socket based interface for the second tier application to the tool control element 110.

To achieve the single instance of the second tier application 302 as shown in FIG. 3, two layers of mapping logic 358 and 360 are provided between the core logic 352 and the socket layers 354 and 356, respectively. Mapping logic 358 maps sockets used by the second tier application 106 to communicate with the first tier application 102 to respective tools. To illustrate, reference is made back to FIG. 2. In FIG. 2, recall that socket 202 is used by the first tier application 102 to communicate with tool control element 110b for controlling tool 112b. Relative to the present invention, mapping logic 360 maps tools to sockets that are used to communicate with the tool control elements 110a–d. The socket 208 of FIG. 2, for example, would be mapped to the tool controlled by tool control element 110b.

Figure 5:
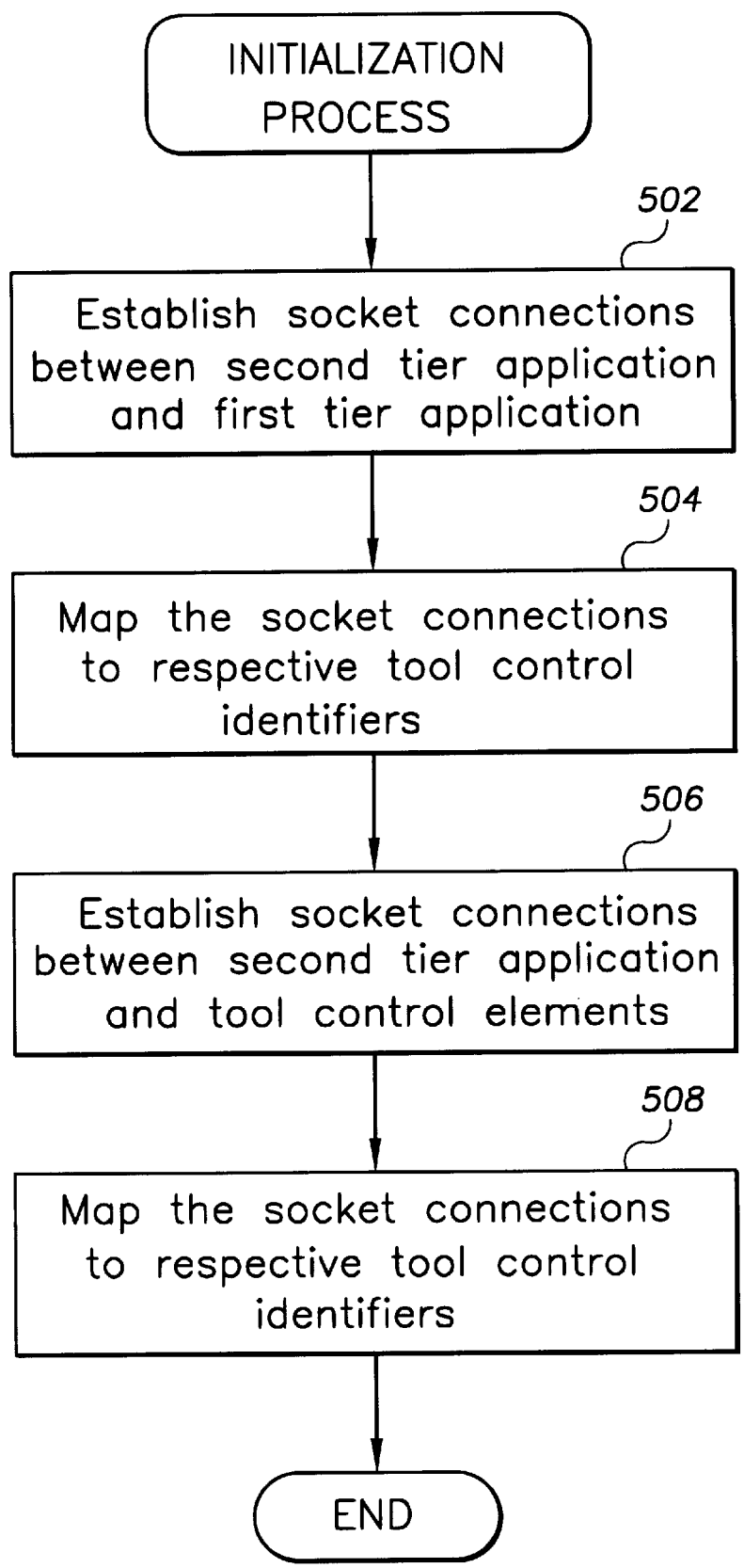
FIG. 5 is a flowchart of processing performed for initialization of mappings of sockets used by the second tier application for communication with the first tier application and with the tool control elements according to an example embodiment of the invention.

FIG. 5 is a flowchart of processing performed for initialization of mappings of sockets used by the second tier application 302 for communication with the first tier application 102 and with the tool control elements 110a–d according to an example embodiment of the invention. At block 502, socket connections are established between the second tier application 302 and the first tier application 102. Because the first tier application 102 uses respective dedicated sockets for controlling the tools 112a–d, the second tier application 302 establishes corresponding sockets 306. In the ISIS embodiment, the first and second tier application each create a single socket for communication, and no first tier mappings are required.

At block 504, the socket connections are "mapped" to or "associated" with respective tool control identifiers, as shown below, for example:

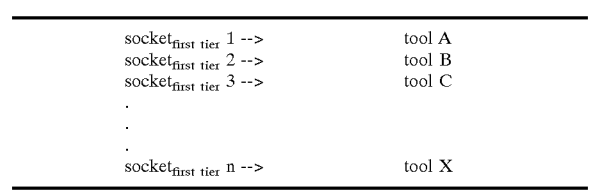

The notation "socket$_{first\ tier}$" refers to the sockets 306 of the second tier application that are used for communication with the first tier application 102, The mapping is used by the mapping logic layer 358 to identify the one of tools A–X for which a message from the first tier application 102 is intended. In the ISIS implementation, respective entry points are created for the different tools.

Respective socket connections 308 are established at block 506 for providing communication between the second tier application 302 and the tool control elements 110a–d. At block 508, the tool identifiers are respectively mapped to the sockets 308 used for communication with the tools as shown below, for example:

This map is used by the second tier application 302 select a socket$_{tool}$ for communication with one of tool control elements 110a–d after having received and processed a message from the first tier application 102.

Figure 6:
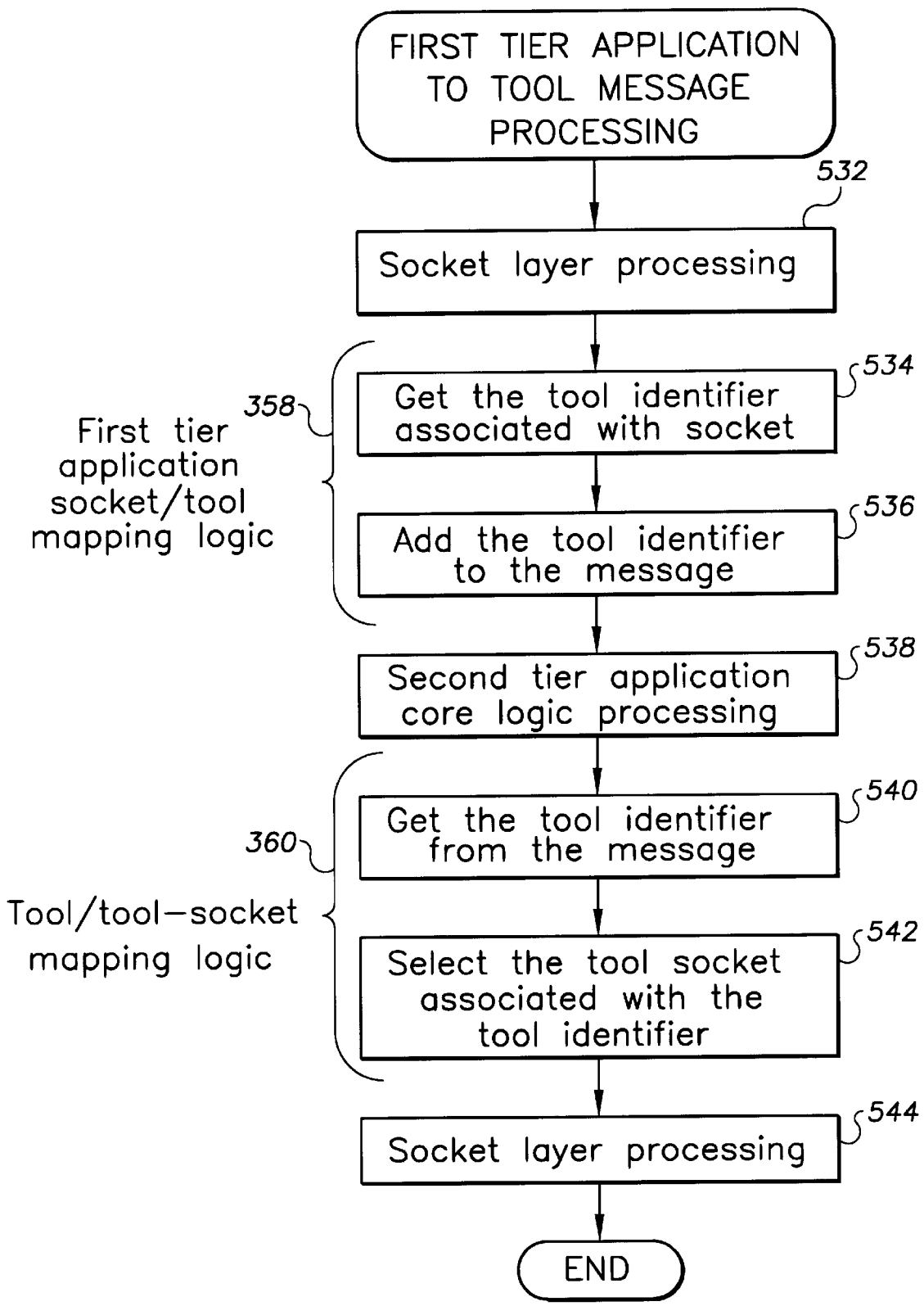
FIG. 6 is a flowchart that shows the processing performed when the second tier application receives a message from the first tier application, according to an example embodiment of the invention.

FIG. 6 is a flowchart that shows the processing performed when the second tier application 302 receives a message from the first tier application 102, according to an example embodiment of the invention. At block 532 a message is received via conventional socket layer 354 processing. Blocks 534 and 536 comprise actions performed by the mapping logic layer 358. Specifically, the tool identifier that is mapped to the one of sockets 306 over which a message was received is obtained from the map and added to the message. The identifier can be inserted in an unused portion of a packet containing the message or appended to the end of the message so as to be ignored by the second tier application core logic 352.

In the ISIS embodiment, tasks are associated with entry points in the second tier application core logic 352 for the respective tools. Thus, based on the task referenced in the message, the associated tool identifier is inserted in the message.

The processing of the core logic 352 is performed at block 538. Blocks 540 and 542 comprise actions performed by the mapping logic layer 360. Specifically, the tool identifier that was added to the message at block 536 is obtained, and the one of sockets 308 that is mapped to the tool identifier is selected. At block 544, the socket layer 356 processing is performed to send the message to one of the tool control elements 110a–d.

FIG. 7 is a flowchart that shows the processing performed when the second tier application 302 receives a message from one of the tool control elements 110a–d, according to an example embodiment of the invention. At block 572 a message is received via conventional socket layer 356 processing. Blocks 574 and 576 comprise actions performed by the mapping logic layer 360. Specifically, the tool identifier that is mapped to the one of sockets 308 over which a message was received is obtained from the map and added to the message. The identifier can be inserted in an unused portion of a packet containing the message or appended to the end of the message so as to be ignored by the second tier application core logic 352.

The processing of the core logic 352 is performed at block 578. It will be appreciated that in most circumstances a message from one of the tool control elements 110a–d will not result in a message being sent outside the second tier application core logic 352. In these cases, no further processing occurs relative to the invention. However, some messages from the tool control elements 110a–d will result in further messages sent from the second tier application 302 to the first tier application 102, in which case the processing shown by blocks 580 and 582 occurs.

Blocks 580 and 582 comprise actions performed by the mapping logic layer 358. Specifically, the tool identifier that was added to the message at block 576 is obtained, and the one of sockets 306 that is mapped to the tool identifier is selected. At block 584, the socket layer 354 processing is performed to send the message to one of the tool control elements 110a–d In the ISIS embodiment, the tool identifier is used to identify a task identifier, which in turn is used as input to a process group look-up function. The process group look-up function returns the address of the first tier application 102.

In a particular example ISIS embodiment, a message originates at the first tier application, for example a Workstream session, and is encoded into a Reliable Distributed Object (RDO) format message. This message contains the process information for a particular lot or batch of lots of semiconductor wafers. The message is then broadcast using ISIS to a waiting second tier application, for example an equipment interface computer, for the particular tool being controlled.

The second tier application receives and decodes the RDO message and creates an application specific Smalltalk object. The Smalltalk object is then accessed to gather the necessary information that governs how the tool is to process the next lot or batch of wafers. Once the application specific rules of the second tier application have been applied to determine what action to perform, the appropriate information is sent to a tool control element in a semiconductor equipment communication standard (SECS) message. The message is streamed to the tool control element via an RS-232 communication link.

As noted above, the present invention is applicable to a number of different multi-tier computing arrangements. Accordingly, the present invention should not be considered limited to the particular examples described above, but rather should be understood to cover all aspects of the invention as fairly set out in the attached claims. Various modifications, equivalent structures, as well as numerous structures to which the present invention may be applicable will be readily apparent to those of skill in the art upon review of the present specification. The claims are intended to cover such modifications and devices.

What is claimed is:

1. A multi-tier computing arrangement, comprising:
a first tier computer system arranged to host a first tier application program;
a plurality of third tier control elements for controlling manufacturing tools; and
a second tier computer system coupled to the first tier computer system and to the third tier control elements and arranged to host a second tier application program, wherein the second tier application program includes
a first connection layer arranged to receive messages from the first tier application program;
a first mapping layer arranged to associate tool identifiers that respectively identify the manufacturing tools with connections between the first tier application program and the second tier application program and store the tool identifiers in portions of the messages unused by the second tier application;
a core logic layer arranged to process the messages;
a second mapping layer arranged to select connections for transmitting the messages to the third tier control elements based on the tool identifiers in the messages and associated connections with the third tier control elements; and
a second connection layer arranged to transmit the messages to the third tier control elements via the selected connections.

2. The system of claim 1, wherein the first tier application program is coupled to the second tier application program via a TCP/IP socket connection.

3. The system of claim 2, wherein the second tier application program is coupled to the third tier control elements via respective SECS interface connections.

4. The system of claim 1, wherein the first tier application program is a manufacturing execution system application.

5. The system of claim 4, wherein the second tier application program is an object oriented application.

6. An apparatus for inter-tier application control in a multi-tier computing environment that includes a first tier application program, a second tier application program, and a plurality of third tier control elements coupled to manufacturing tools, wherein the second tier application program initiates processing of the third tier control element in response to messages from the first tier application program, comprising:
means for associating tool identifiers that respectively identify the manufacturing tools with connections between the first tier application program and the second tier application program;
means for associating the tool identifiers with connections between the second tier application program and the third tier control elements;
means for receiving messages from the first tier application by the second tier application;
means for obtaining tool identifiers by reference to the associated connections over which messages are received and storing the tool identifiers in portions of the messages unused by the second tier application;
means for selecting connections for transmitting the messages to the third tier control element based on the tool identifiers in the messages and associated connections with the third tier control elements; and
means for transmitting the messages to the third tier control elements.

7. A method for inter-tier control in a multi-tier computing environment that includes a first tier application program, a second tier application program, and a plurality of third tier control elements coupled to manufacturing tools, wherein the second tier application program initiates processing of the third tier control element in response to messages from the first tier application program, comprising:
associating tool identifiers that respectively identify the manufacturing tools with connections between the first tier application program and the second tier application program;

associating the tool identifiers with connections between the second tier application program and the third tier control elements; and for a message sent from the first tier application program to the second tier application program to initiate a processing sequence by a third tier control element, obtaining a tool identifier by reference to the associated connection over which the message was received, storing the tool identifier in a portion of the message unused by the second tier application, performing second tier application processing on the message, and selecting a connection for transmitting the message to the third tier control element based on the tool identifier in the message and an associated connection with one of the third tier control elements.

8. The method claim 7, further comprising, for a message sent from the third tier control elements to the second tier application program to be acted upon by the first tier application program, obtaining a tool identifier by reference to the associated connection over which the message was received, storing the tool identifier in a portion of the message unused by the second tier application, performing second tier application processing on the message, and selecting a connection for transmitting the message to the first tier application program based on the tool identifier in the message and an associated connection with the first tier application program.

9. The method claim 8, wherein the connections between the first tier application program and the second tier application program are TCP/IP socket connections.

10. The method claim 9, wherein the connections between the second tier application program and the third tier control elements are SECS interface connections.

11. The method claim 9, wherein the connections between the second tier application program and the third tier control elements are TCP/IP socket connections.

12. The method claim 7, wherein the connections between the second tier application program and the third tier control elements are SECS interface connections.

13. The method claim 7, further comprising:
   instantiating on a first computer system a process for the first tier application program; and
   instantiating on a second computer system a single process for the second tier application program.

* * * * *

UNITED STATES PATENT AND TRADEMARK OFFICE
CERTIFICATE OF CORRECTION

PATENT NO.   : 6,349,341
DATED        : February 19, 2002
INVENTOR(S)  : Likes

It is certified that error appears in the above-identified patent and that said Letters Patent is hereby corrected as shown below:

Column 1,
Line 60, "messages, The" should read -- messages. The --.

Column 2,
Line 17, "comprises" should read -- comprises: --.
Line 22, "elements)" should read -- elements; --.
Line 39, after "second" please delete "is".

Column 3,
Line 3, after "tool" please delete "is".
Line 38, "beat" should read -- best --.

Column 5,
Line 30, "cite" should read -- tier --.

Column 6,
Line 15, "102, The" should read -- 102. The --.

Signed and Sealed this

Twenty-first Day of May, 2002

Attest:

Attesting Officer

JAMES E. ROGAN
Director of the United States Patent and Trademark Office